United States Patent
Hachiro et al.

(10) Patent No.: US 9,900,460 B2
(45) Date of Patent: Feb. 20, 2018

(54) IMAGE READING APPARATUS AND CONTROL METHOD

(71) Applicant: CANON KABUSHIKI KAISHA, Tokyo (JP)

(72) Inventors: Shigeki Hachiro, Yokohama (JP); Hideyuki Kido, Isehara (JP); Tomofumi Nishida, Yokohama (JP); Toshiyuki Kuroda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/813,606

(22) Filed: Jul. 30, 2015

(65) Prior Publication Data
US 2016/0050334 A1 Feb. 18, 2016

(30) Foreign Application Priority Data
Aug. 18, 2014 (JP) .................. 2014-166096

(51) Int. Cl.
*H04N 1/00* (2006.01)
*H04N 1/40* (2006.01)
*H04N 1/203* (2006.01)
*H04N 1/387* (2006.01)

(52) U.S. Cl.
CPC ....... *H04N 1/2034* (2013.01); *H04N 1/00708* (2013.01); *H04N 1/00774* (2013.01); *H04N 1/387* (2013.01); *H04N 1/40* (2013.01)

(58) Field of Classification Search
CPC ............. H04N 1/2034; H04N 1/00708; H04N 1/00774; H04N 1/387
USPC .............. 358/449, 426.01; 382/232; 345/555
See application file for complete search history.

(56) References Cited

U.S. PATENT DOCUMENTS

| 7,447,363 | B2* | 11/2008 | Tanabe | H04N 19/70 375/E7.103 |
| 2005/0157934 | A1 | 7/2005 | Tanabe et al. | |
| 2013/0242355 | A1* | 9/2013 | Morita | H04N 1/00734 358/449 |
| 2014/0233071 | A1 | 8/2014 | Kido | |
| 2015/0177924 | A1 | 6/2015 | Kuroda | |

FOREIGN PATENT DOCUMENTS

JP 2003-324611 A 11/2003

* cited by examiner

*Primary Examiner* — Quang N Vo
(74) *Attorney, Agent, or Firm* — Fitzpatrick, Cella, Harper & Scinto

(57) ABSTRACT

It is determined based on processing to be performed on image data generated by reading by a first reading unit and a second reading unit, whether to separate, into image data of the first surface and image data of the second surface, image data that has been generated by reading by the first reading unit configured to read the first surface of a document, and the second reading unit configured to read the second surface of the document, and that includes the first surface and the second surface. When it is determined to separate the image data, the image data including the first surface and the second surface is separated into the image data of the first surface and the image data of the second surface.

21 Claims, 15 Drawing Sheets

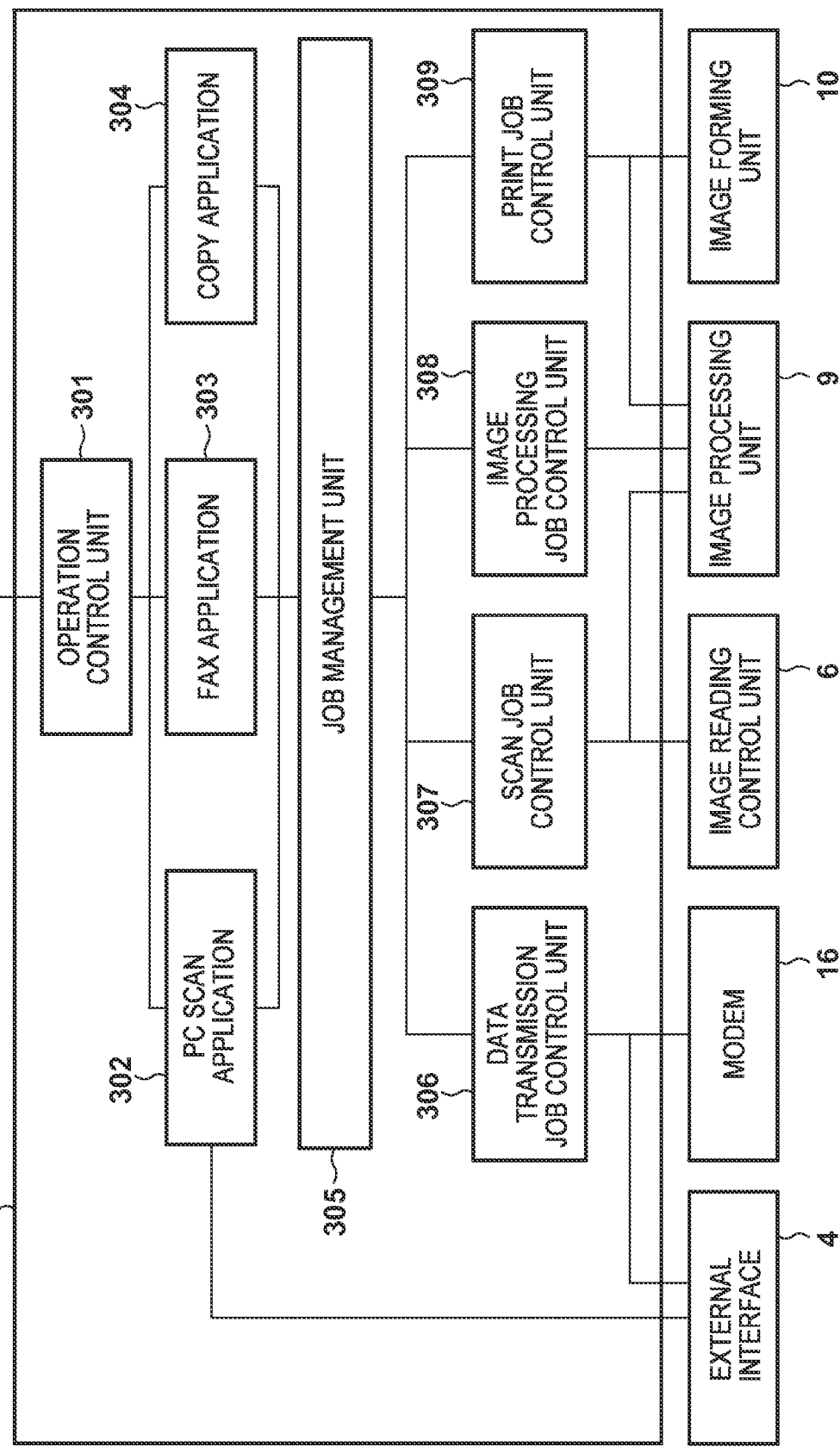

FIG. 4A

```
<resolution> 600
<format> JPEG
<quality> normal
<duplex> NO
```

FIG. 4B

```
<resolution> 600
<format> JPEG
<quality> normal
<duplex> YES
```

FIG. 5

```
<resolution> 600
<format> JPEG
<quality> normal
<duplex> YES
<duplex_custom> Connect
```

FIG. 7A

| JOB INFORMATION | |
|---|---|
| ITEM | SET VALUE |
| APPLICATION | PC SCAN |
| DOCUMENT PAPER SIZE | A4 |
| FILE FORMAT | JPEG |
| QUALITY | NORMAL |
| DOUBLE-SIDED READING TYPE | DOUBLE-SIDED_CONNECT |

FIG. 7B

| JOB INFORMATION | |
|---|---|
| ITEM | SET VALUE |
| APPLICATION | PC SCAN |
| DOCUMENT PAPER SIZE | A4 |
| FILE FORMAT | JPEG |
| QUALITY | NORMAL |
| DOUBLE-SIDED READING TYPE | DOUBLE-SIDED |

| APPLICATION | DOUBLE-SIDED READING TYPE | FIRST JOB CONTROL UNIT | SECOND JOB CONTROL UNIT | THIRD JOB CONTROL UNIT |
|---|---|---|---|---|
| PC SCAN | DOUBLE-SIDED_CONNECT | SCAN | DATA TRANSMISSION | — |
|  | DOUBLE-SIDED | SCAN | IMAGE PROCESSING | DATA TRANSMISSION |
|  | SINGLE-SIDED | SCAN | PRINT | — |
| COPY | — | SCAN | PRINT | — |
| FAX | — | SCAN | IMAGE PROCESSING | DATA TRANSMISSION |

900

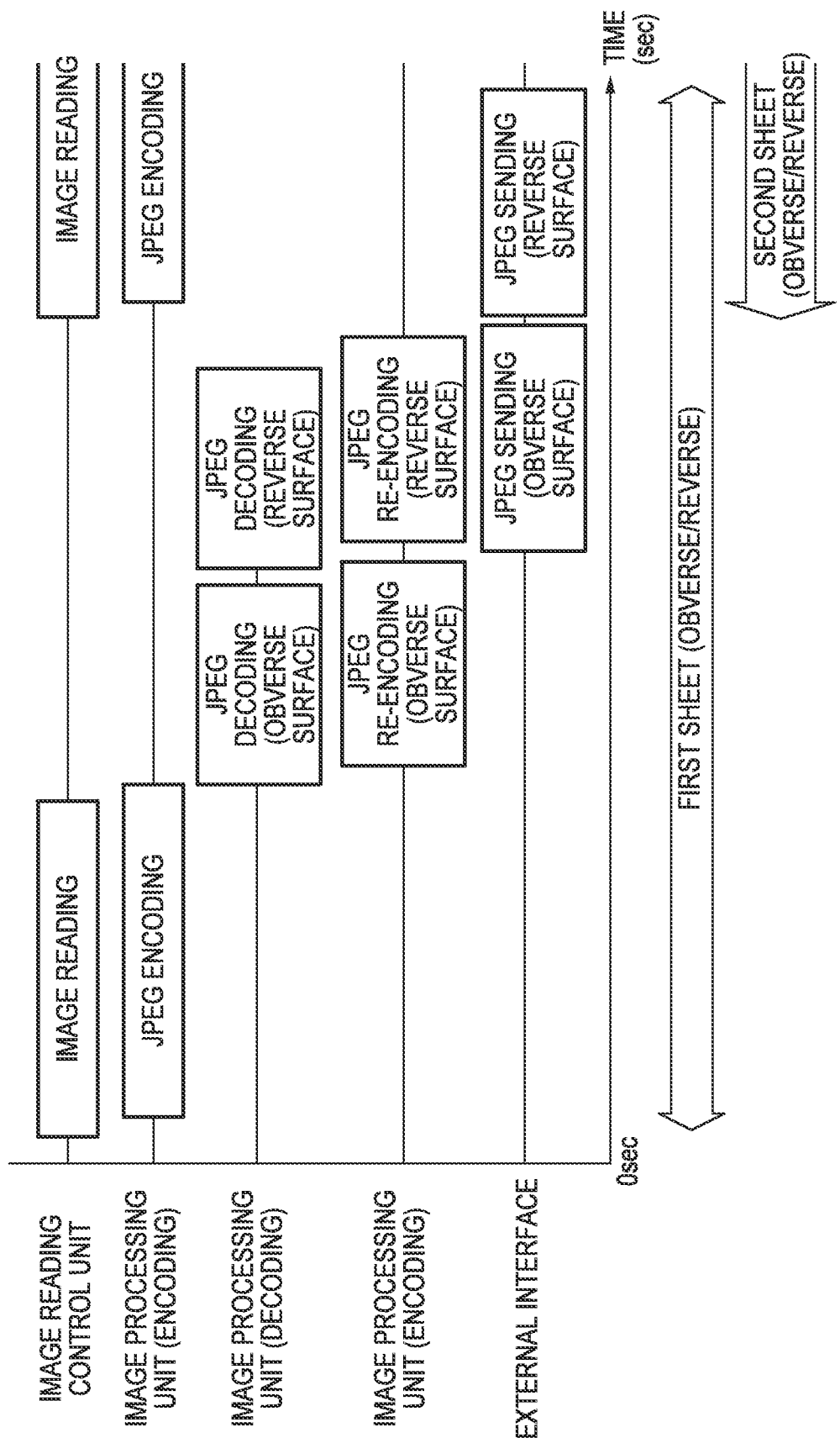

000# IMAGE READING APPARATUS AND CONTROL METHOD

BACKGROUND OF THE INVENTION

Field of the Invention

The present invention relates to an image reading apparatus capable of reading the obverse and reverse surfaces of a document by one reading operation, and a control method.

Description of the Related Art

There is known an image reading apparatus capable of reading the reverse surface of a document during reading of the obverse surface. Japanese Patent Laid-Open No. 2003-324611 discloses an arrangement in which the images of obverse and reverse surfaces are read in parallel and compression processing of image data is performed efficiently with a small-capacity image memory. Japanese Patent Laid-Open No. 2003-324611 discloses an arrangement in which JPEG encoding is performed on an integrated file of respective image data corresponding to the obverse and reverse surfaces, and the encoded image data is transmitted to a host computer.

However, Japanese Patent Laid-Open No. 2003-324611 describes that the host computer separates the image data of the obverse surface and the image data of the reverse surface. When an apparatus at the image data transmission destination does not have a function of separating image data, image data of the obverse surface and image data of the reverse surface may not be separately displayed. In this case, an output result intended by the user may not be obtained. Also, an output result intended by the user may not be obtained depending on a document and a set binding direction.

SUMMARY OF THE INVENTION

An aspect of the present invention is to eliminate the above-mentioned problems with the conventional technology. The present invention provides an image reading apparatus that reads the obverse and reverse surfaces of a document and outputs image data in consideration of processing to be performed on image data obtained by reading a document, and a control method.

The present invention in one aspect provides an image reading apparatus comprising: a first reading unit configured to read a first surface of a document when reading the document; a second reading unit configured to read a second surface of the document; a determination unit configured to determine, based on processing to be performed on image data generated by reading by the first reading unit and the second reading unit, whether to separate, into image data of the first surface and image data of the second surface, image data that has been generated by reading by the first reading unit and the second reading unit and includes the first surface and the second surface; and a separation unit configured to, when the determination unit determines to separate the image data, separate the image data including the first surface and the second surface into the image data of the first surface and the image data of the second surface.

According to the present invention, the obverse and reverse surfaces of a document can be read to output image data in consideration of processing to be performed on image data obtained by reading a document.

Further features of the present invention will become apparent from the following description of exemplary embodiments with reference to the attached drawings.

BRIEF DESCRIPTION OF THE DRAWINGS

FIG. 3 is a block diagram showing the arrangement of a program that controls the multifunctional peripheral;

FIGS. 4A and 4B are views showing instruction information that is transmitted from a computer;

FIG. 5 is a view showing instruction information including a request to integrate the images of the obverse and reverse;

FIGS. 7A and 7B are tables showing job information;

FIGS. 10A and 10B are timing charts each showing a processing order;

DESCRIPTION OF THE EMBODIMENTS

Figure 1:
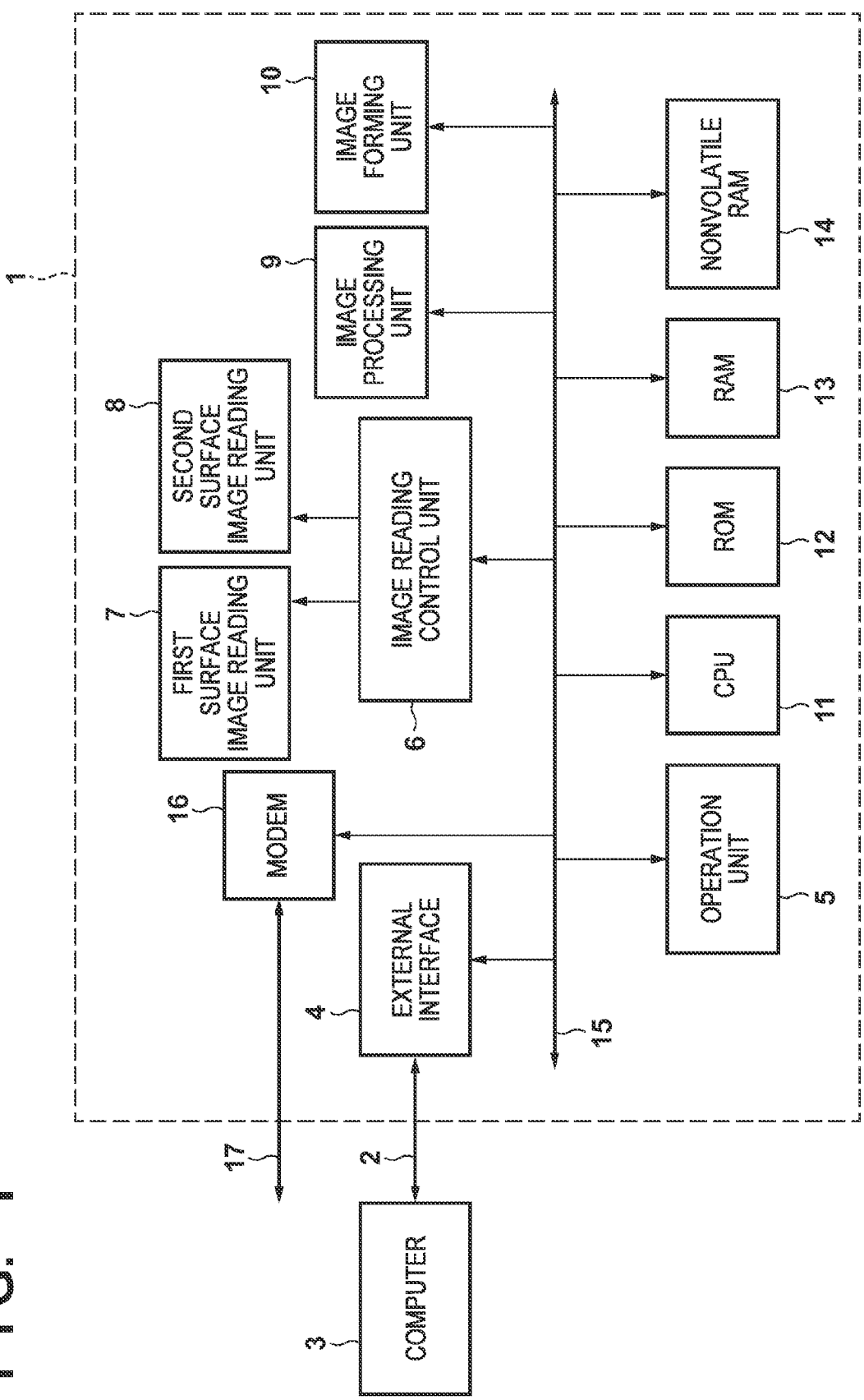
FIG. 1 is a block diagram showing the arrangement of a multifunctional peripheral.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First Embodiment

FIG. 1 is a block diagram showing the arrangement of an image reading apparatus. In this embodiment, a multifunctional peripheral (MFP) integrally having a plurality of functions such as a copy function, scan function, printer function, and facsimile function is used as the image reading apparatus. An MFP 1 is connected to a computer 3 such as an external PC via an external interface 4 and an external bus 2 so that the MFP 1 and the computer 3 can communicate with each other. The external bus 2 is constituted by a USB (Universal Serial Bus), but may also be another interface such as a network connection capable of connecting the MFP 1 to a plurality of external apparatuses, or wireless communication.

A CPU 11 is a processor that performs centralized control of the MFP 1. An internal bus 15 is a bus that connects respective blocks to each other. A ROM 12 stores programs that run on the CPU 11, and various data. A RAM 13 is a writable working memory in which storage data is volatilized upon power-off, and is also used as the working memory of the CPU 11. A nonvolatile RAM 14 is a writable memory in which internal data is not volatilized even upon power-off. The CPU 11 implements an operation according to this embodiment by, for example, reading out a program stored in the ROM 12 to the RAM 13 and executing it. An operation unit 5 accepts various operation instructions from an operator (user) and displays, to the user, various states of the MFP 1 such as the power state, the status of each job, and the like.

In the MFP 1, a first surface image reading unit 7 and a second surface image reading unit 8 are image sensor units that optically read the first surface (obverse surface) and second surface (reverse surface) of a document, respectively. Each image sensor unit includes a light source that irradiates a document with light, and an image sensor constituted by arraying elements that read light reflected by a document and photoelectrically convert the light.

The MFP 1 can read the two surfaces of a double-sided document by the two image reading units substantially almost simultaneously (by one reading operation). The first surface image reading unit 7 reads the first surfaces of a single-sided document and double-sided document, and the second surface image reading unit 8 reads the second surface of a double-sided document. By almost simultaneously reading the two surfaces of a double-sided document, the reading time of the double-sided document can be shortened.

An image reading control unit 6 performs A/D (analog-to-digital) conversion of analog signals from the first surface image reading unit 7 and the second surface image reading unit 8, and also performs characteristic correction such as gain adjustment of the first surface image reading unit 7 and the second surface image reading unit 8. The image reading control unit 6 includes a circuit that performs DMA (Direct Memory Access) transfer in order to store digital image data in the RAM 13.

Figures 8, 9:
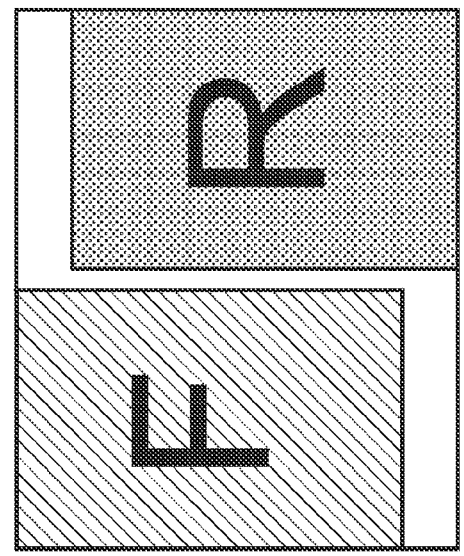
FIG. 8 is a view showing integrated image data of the obverse and reverse surfaces.
FIG. 9 is a table showing a job control unit selection table.

The MFP 1 uses one image reading control unit 6 to process analog signals output from the two image reading units, that is, the first surface image reading unit 7 and the second surface image reading unit 8. When reading a double-sided document, the image reading control unit 6 processes analog signals output from the two image reading units sequentially in the order of the first surface and second surface, and stores them as one digital image data in the RAM 13. The read image data therefore includes image data of the first surface (F surface) and image data of the second surface (R surface) in one image data, as shown in FIG. 8. By processing signals from the two image reading units by one image reading control unit in this manner, the circuit scale and the cost can be reduced, compared to a case in which two image reading control units are arranged.

An image processing unit 9 is a circuit that reads out image data stored in the RAM 13 and performs various image processes and image conversion processing for image formation. The image processing unit 9 includes a circuit that reads out image data stored in the RAM 13 and performs encoding processing based on JPEG or the like, and a circuit that performs decoding processing on encoded data. Although JPEG is exemplified here as the encoding method, the encoding method is not limited to JPEG encoding and another encoding method is also usable. In this embodiment, encoding processing and decoding processing of the image processing unit 9 can be executed simultaneously, and encoding processing can be executed simultaneously only for up to one image.

[Scan Function]

When reading a double-sided document, the image reading control unit 6 controls the image processing unit 9 to perform encoding processing on image data stored in the RAM 13 according to JPEG or the like, and stores again the encoded data in the RAM 13. Encoding processing by the image processing unit 9 is performed in parallel to processing of storing image data of the image reading control unit 6 in the RAM 13. The image reading control unit 6 frees an area of the RAM 13 where image data having undergone encoding processing has been stored, and uses this area again to store image data by the image reading control unit 6. By sequentially encoding read image data, many image data can be stored in the RAM 13 in comparison with a case in which image data are not encoded. As a result, efficient reading can be implemented even when a usable storage area is limited. Also, when transmitting image data to the external computer 3, the speed can be increased because the communication data amount is smaller than that in a case in which image data are not encoded.

In the case of using the MFP 1 as a scanner, when performing reading of a single-sided document by using an automatic document feeding device, first, the first surface image reading unit 7 reads the obverse surface of a document stacked on a document stacking unit (to be described later), and outputs an analog signal. The image reading control unit 6 performs A/D conversion and characteristic correction, and stores the resultant signal as image data in the RAM 13. The image processing unit 9 JPEG-encodes the image data stored in the RAM 13, and stores the encoded data in the RAM 13. The image processing unit 9 transmits the encoded data to the computer 3 via the external interface 4 and the external bus 2.

When reading a double-sided document by using the automatic document feeding device, first, the first surface image reading unit 7 and the second surface image reading unit 8 almost simultaneously read the obverse and reverse surfaces of a document stacked on the document stacking unit (to be described later), and output analog signals. The image reading control unit 6 performs A/D conversion and characteristic correction, and stores integrated image data of image data of the first and second surfaces of the double-sided document in the RAM 13. The image processing unit 9 JPEG-encodes the image data stored in the RAM 13, and stores the encoded data in the RAM 13. The image processing unit 9 transmits the encoded data to the computer 3 via the external interface 4 and the external bus 2.

Upon receiving the integrated encoded data of the first and second surfaces of the double-sided document, the computer 3 decodes the encoded data, extracts the document regions of the respective surfaces, and creates image data corresponding to the respective surfaces. The image data are re-encoded based on JPEG or the like, and stored in the storage area of the computer 3.

The operation of transmitting integrated encoded data of the first and second surfaces of a double-sided document to the computer 3 has been explained. However, it is also possible to decode encoded data by the MFP 1, extract the first and second surfaces, and transmit the respective image data to the computer 3. In this case, while decoding the document region of the first surface, the image processing unit 9 re-encodes the integrated encoded data of the first and second surfaces of the double-sided document that is stored in the RAM 13, and stores the encoded data of the first surface in the RAM 13. Then, while decoding the document region of the second surface, the image processing unit 9 re-encodes the integrated encoded data, and stores the encoded data of the second surface in the RAM 13. The image processing unit 9 transmits the encoded data of the first surface and the encoded data of the second surface, which are stored in the RAM 13, to the computer 3 via the external interface 4 and the external bus 2. Although the operation of storing encoded data once in the RAM 13 and then transmitting it to the computer 3 has been explained, re-encoding and sending may be performed in parallel.

[Copy Function]

When executing the copy function for a single-sided document by using the MFP 1 as a copying apparatus, an operation up to storage of encoded data in the RAM 13 is the same as scanning of a single-sided document. The image processing unit 9 decodes the encoded data, performs various image processes on the image data, and outputs the image data to an image forming unit 10. The image forming unit 10 forms an image on a printing medium based on the image data having undergone the image processes.

Even when executing the copy function for a double-sided document, an operation up to storage of encoded data in the RAM 13 is the same as scanning of a double-sided document. The image processing unit 9 decodes image data corresponding to the first surface from the encoded data, performs various image processes on the image data, and outputs the image data to the image forming unit 10. The image forming unit 10 forms an image on a printing medium based on the image data that corresponds to the first surface and has undergone the image processes. Then, the image processing unit 9 decodes image data corresponding to the second surface from the encoded data, performs various image processes on the image data, and outputs the image data to the image forming unit 10. The image forming unit 10 forms an image on the printing medium based on the image data of the second surface having undergone the image processes.

[Facsimile Transmission Function]

When transmitting a single-sided document by using the MFP 1 as a reading-side facsimile, an operation up to storage of image data in the RAM 13 is the same as scanning of a single-sided document. The image processing unit 9 encodes image data in the RAM 13 by using JPEG or the like, and stores it again as code data in the RAM 13. The CPU 11 writes the code data read out from the RAM 13 in a modem 16, performs modulation, and transmits the data to an external facsimile apparatus via a public line 17 based on a communication function defined by the CCITT recommendation.

When transmitting a double-sided document, an operation up to storage of encoded data in the RAM 13 is the same as scanning of a double-sided document. The image processing unit 9 decodes image data corresponding to the first surface from the encoded data, re-encodes the image data based on JPEG or the like, and stores it again as code data of the first surface in the RAM 13. The code data of the first surface is transmitted to an external facsimile apparatus, as in the case of a single-sided document. Then, the image processing unit 9 decodes image data corresponding to the second surface from the encoded data, encodes the image data based on JPEG or the like, and stores it again as code data of the second surface in the RAM 13. After the end of transmitting the code data of the first surface, the code data of the second surface is transmitted to the external facsimile apparatus.

Figure 2:
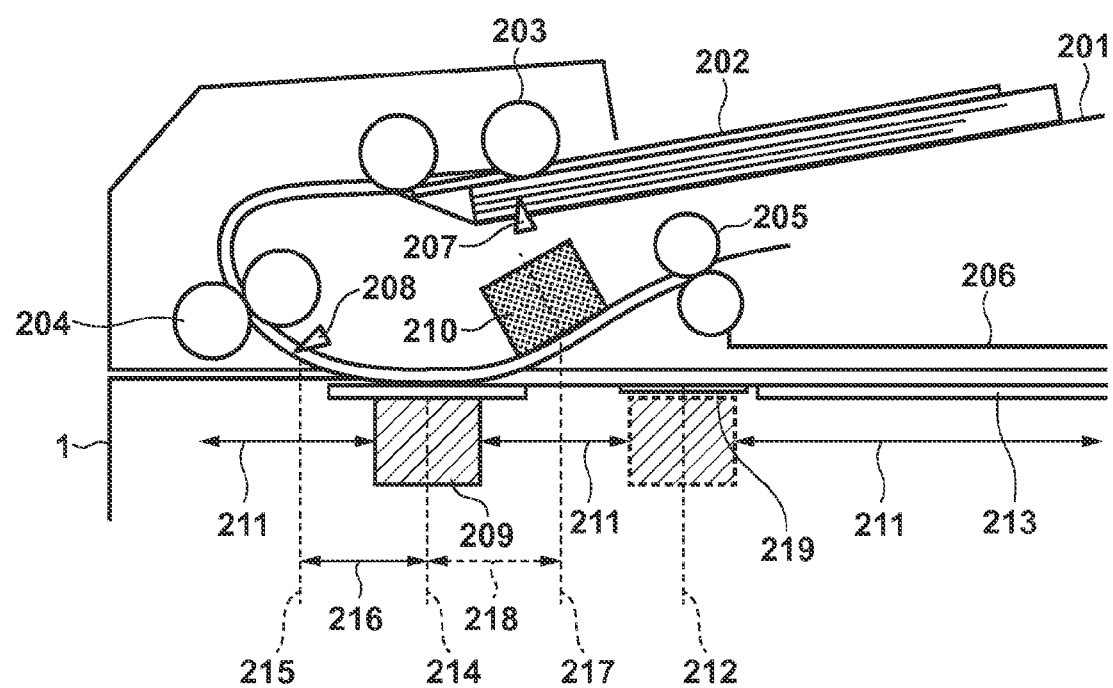
FIG. 2 is a view showing the arrangement of an automatic document feeding device.

FIG. 2 is a view for explaining the operation of the automatic document feeding device of the MFP 1. FIG. 2 is a schematic sectional view showing the document conveyance path of the automatic document feeding device. In the automatic document feeding device, a document stacking unit 201 is a stacking tray for stacking document sheets. When performing reading using the automatic document feeding device, first, a feed roller 203 feeds a top document sheet 202 in the document stacking unit 201 into the automatic document feeding device. The document sheet 202 is conveyed by conveyance rollers 204 along the conveyance path. When the leading end of the document sheet reaches a first surface reading position 214, reading starts. After the start of reading, reading is performed at the same time as conveyance of the document sheet 202 (so-called flow scanning). After reading is performed up to the trailing end of the document sheet or a predetermined number of document sheets are read, reading is ended.

The document sheet 202 after the end of reading is discharged to a document discharge unit 206 by discharge rollers 205. An arrangement in which reading starts from the leading end of a document sheet and is performed up to the trailing end of the document sheet has been explained here. However, an arrangement is also possible, in which reading starts in advance by a predetermined amount from the leading end of a document sheet or reading is ended later by a predetermined amount from the trailing end of a document sheet.

A first surface image reading unit 209 is an image sensor unit for reading the first surface of a document sheet, and corresponds to the first surface image reading unit 7 in FIG. 1. The first surface of a document sheet corresponds to the face-up surface of the document sheet 202 stacked in the document stacking unit 201. The first surface image reading unit 209 is movable in directions indicated by arrows 211 in FIG. 2, and is positioned at a standby position 212 except for the course of a reading operation. In the case of reading using the automatic document feeding device, the first surface image reading unit 209 stops at the first surface reading position 214, and reads the first surface of a document sheet conveyed along the conveyance path. A standby position 212 is maintained accurately by detecting the position of the first surface image reading unit 209 using a calibration sheet 219 (to be described later).

A second surface image reading unit 210 is an image sensor unit for reading the second surface of a document sheet, and corresponds to the second surface image reading unit 8 in FIG. 1. The second surface image reading unit 210 is fixed at a second surface reading position 217 of the automatic document feeding device, and reads the second surface of a document sheet conveyed along the conveyance path. The second surface of a document sheet corresponds to the face-down surface of the document sheet 202 stacked in the document stacking unit 201.

The first surface image reading unit 209 and the second surface image reading unit 210 are spaced apart from each other by a reading unit distance 218. When performing simultaneous double-sided reading, the first surface document image position and the second surface document image position in a read image are spaced apart from each other by the reading unit distance 218. In this embodiment, an operation of reading two surfaces by one document conveyance using the two reading units 209 and 210 will be called simultaneous double-sided reading. In simultaneous double-sided reading, the obverse and reverse surfaces need not always be read simultaneously. FIG. 8 shows image data obtained by simultaneous double-sided reading. An arrangement in which the second surface image reading unit 210 is fixed to the automatic document feeding device has been explained. However, it is also possible that the second surface image reading unit 210 is movable and the second surface reading position 217 is adjusted. A white plate (not shown) is installed to face the image sensor so as to read white by the first surface image reading unit 209 and the second surface image reading unit 210 in a state in which no document sheet exists at the respective reading target positions.

A document sensor 207 is a sensor for detecting the presence/absence of a document sheet on the document stacking unit 201. A document leading end sensor 208 is a sensor for detecting the leading end position of a document sheet conveyed by the conveyance rollers 204. When the leading end of the document sheet 202 conveyed by the conveyance rollers 204 reaches the document leading end sensor 208, the sensor value changes, and the document leading end sensor 208 detects that the leading end of the document sheet 202 is at a position 215 of the document leading end sensor 208. Also, when the trailing end of the document sheet 202 passes the document leading end sensor 208, the sensor value changes, and the document leading end sensor 208 detects that the trailing end of the document sheet 202 is at the position 215 of the document leading end sensor 208.

Reading is started and ended based on the detected leading end position and trailing end position of the document sheet. The reading start timing of the document sheet 202 is set to be a timing after the document sheet is conveyed by a predetermined conveyance amount (reading start conveyance amount) upon detecting the leading end position of the document sheet by the document leading end sensor 208. The reading end timing of the document sheet 202 is set to be a timing after the document sheet is conveyed by a predetermined conveyance amount (reading end conveyance amount) upon detecting the trailing end position of the document sheet by the document leading end sensor 208. The document leading end sensor 208 functions as a reference position on the conveyance path in order to determine the timings of the reading start and reading end.

The first surface image reading unit 209 is used not only for reading using the automatic document feeding device, but also for stationary document reading. In stationary document reading, the first surface image reading unit 209 reads a document sheet set on a stationary document reading surface 213 while moving in the direction of the stationary document reading surface 213.

The calibration sheet 219 is a sheet for acquiring the white reference in order to perform characteristic correction of the first surface image reading unit 209. On the calibration sheet 219, a pattern for determining the reference position of the moving first surface image reading unit 209 is formed. The calibration sheet 219 is also used to detect the position 214 of the first surface image reading unit 209. While moving, the first surface image reading unit 209 reads the vicinity of the calibration pattern 219, and detects the pattern from the read image to detect the position 214 of the first surface image reading unit 209. The standby position 212 is set to be a relative position of a predetermined distance from the detected position 214, and the standby position 212 of the first surface image reading unit 209 can be maintained accurately. The detection of the position 214 of the first surface image reading unit 209 may be performed every time upon power-on and before movement to the standby position 212 after the end of the reading operation.

It has been explained here that the position 214 of the first surface image reading unit 209 is detected using the calibration sheet 219. However, the position detection method is not particularly limited. The position may be detected by arranging a sensor that detects the position 214 of the first surface image reading unit 209. Alternatively, the position may be detected by moving the first surface image reading unit 209 as much as possible, abutting it against the end portion of the movable range, and stopping it.

FIG. 3 is a block diagram showing the arrangement of a program 300 that controls the MFP 1 according to this embodiment. The program 300 includes blocks 301 to 309, is read out from the ROM 12 to the RAM 13, and executed by the CPU 11.

The function of each block will be explained. The operation control unit 301 transfers user instruction information accepted via the operation unit 5 to the PC scan application 302, the FAX application 303, and the copy application 304. The operation control unit 301 also has a function of outputting the state of the MFP 1 and the progress of each application to the operation unit 5.

The PC scan application 302 has a function of analyzing instruction information received from the computer 3 via the external interface 4, and requesting the job management unit 305 to execute a job. The instruction information transmitted from the computer 3 includes commands by predetermined text data as shown in FIGS. 4A and 4B, and can designate the resolution, image format, quality, and presence/absence of double-sided reading. FIG. 4A shows commands when a JPEG image of a normal quality is requested in reading of only a single side at a resolution of 600 dpi. FIG. 4B shows commands when a JPEG image of a normal quality is requested in reading of double sides at a resolution of 600 dpi. Further, in this embodiment, a command <duplex_custom> is prepared, as shown in FIG. 5, and can request an integrated JPEG image of obverse and reverse images by designating "Connect" as a parameter. The integrated image of obverse and reverse images is an image in which image data corresponding to the obverse surface and image data corresponding to the reverse surface are arranged in one image data, as shown in FIG. 8. In this embodiment, the first surface image reading unit 209 and the second surface image reading unit 210 are physically spaced apart from each other, as shown in FIG. 2. Thus, positions in the conveyance direction in reading at the same timing are different, and image data of the obverse and reverse surfaces are arranged at vertically shifted positions, as shown in FIG. 8.

Figure 6:
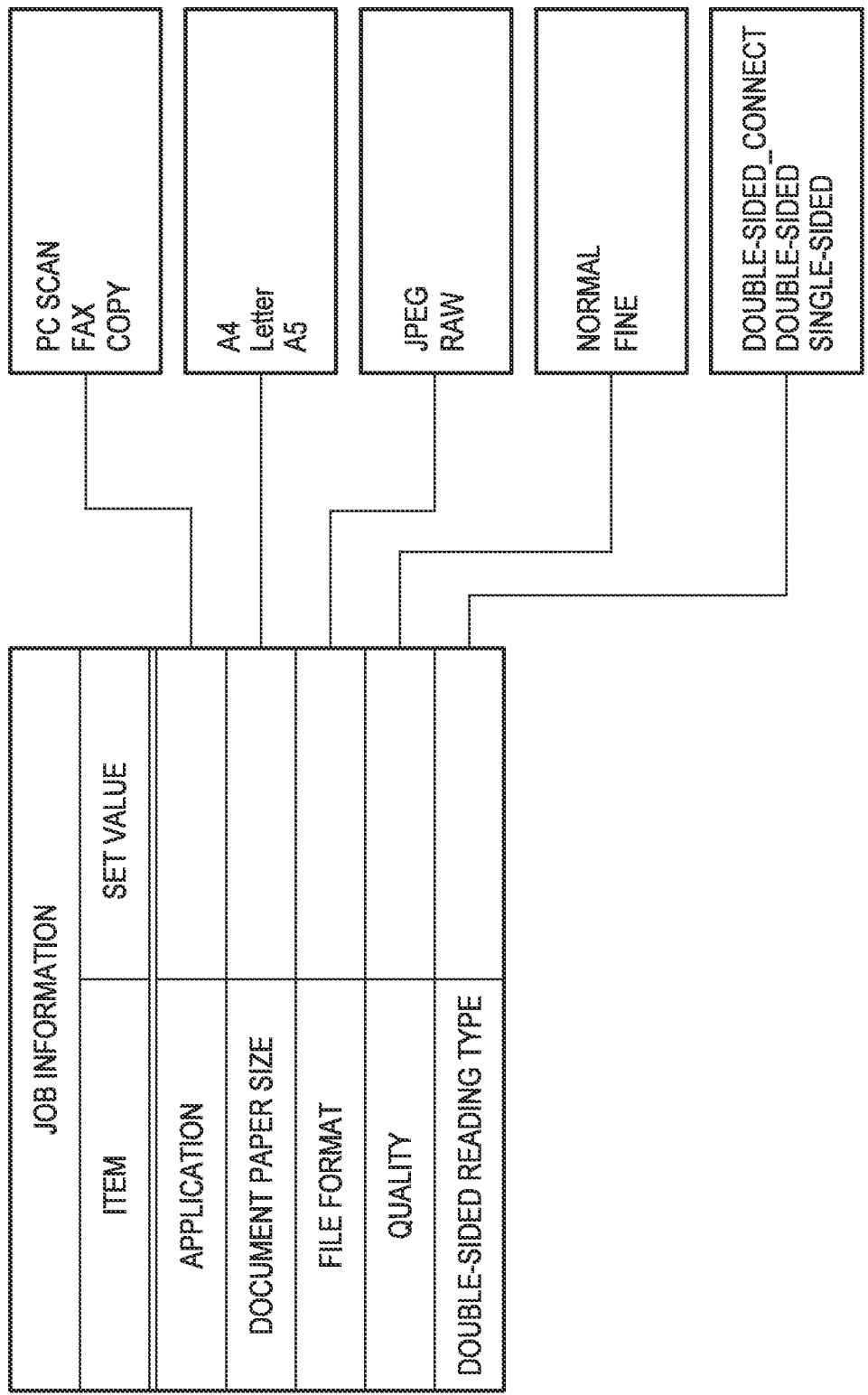
FIG. 6 is a view showing the respective items of job information.

The FAX application 303 and the copy application 304 analyze instruction information received from the operation control unit 301, and request the job management unit 305 to execute a job. The execution request received by the job management unit 305 includes job information as shown in FIG. 6, and can designate the respective items of a requesting-side application, document paper size, output file format, quality, double-sided reading type, and printing size. For example, PC scan/FAX/copy can be designated as the application, and A4/Letter/A5 can be designated as the document paper size. JPEG/RAW can be designated as the file format, and normal/fine can be designated as the quality. As the double-sided reading type, "double-sided_connect", "double-sided", and "single-sided" can be designated. "double-sided_connect" indicates designation of integrated image data of obverse and reverse images, as shown in FIG. 8.

Based on a job execution request received from each application, the job management unit 305 controls a processing execution request by selecting and combining necessary job control units out of the job control units 306 to 309. At this time, by using a job control unit selection table 900 as shown in FIG. 9, the job management unit 305 determines job control units that are used to fulfill the execution request. As shown in FIG. 9, the job selection table 900 describes job control units that should be used for the respective items "application" and "double-sided reading type". In this embodiment, a maximum of three, first to third job control units can be designated.

The data transmission job control unit 306 controls to transmit image data stored in the RAM 13 to an external apparatus via the external interface 4 or the modem 16. The scan job control unit 307 controls the image reading control unit 6 and the image processing unit 9 to store JPEG-encoded image data in the RAM 13. The image processing job control unit 308 controls the image processing unit 9 to separate image data into image data corresponding to the obverse surface and image data corresponding to the reverse surface. The print job control unit 309 outputs image data decoded by the image processing unit 9 to the image forming unit 10, and controls the image forming unit 10 to execute printing.

A case will be explained, in which the computer 3 copes with processing of extracting image data of the respective obverse and reverse surfaces from integrated image data of the obverse and reverse images. First, the computer 3 transmits, to the MFP 1, a command in which <duplex_custom> is designated by "Connect", as shown in FIG. 5. The MFP 1 uses the PC scan application 302 to analyze the command received from the computer 3, and generate job information shown in FIG. 7A. In this case, since <duplex_custom> is designated by "Connect" in the command, "double-sided_connect" is designated as the double-sided type of job information.

Then, the job management unit 305 looks up the job selection table 900 to select a job control unit to be used. Since "application" in the job information shown in FIG. 7A is "PC scan" and "double-sided reading type" is "double-sided_connect", the scan job control unit 307 is selected as the first job control unit. In addition, the data transmission job control unit 306 is selected as the second job control unit. In accordance with the selection, the job management unit 305 requests the scan job control unit 307 serving as the first job control unit to read an image, and requests the data transmission job control unit 306 serving as the second job control unit to transmit image data to the computer 3.

The scan job control unit 307 controls the image reading control unit 6 to acquire image data corresponding to the obverse and reverse surfaces. At this time, the scan job control unit 307 controls to output the respective image data corresponding to the obverse and reverse surfaces side by side in the RAM 13. The image reading control unit 6 outputs image data for every 16 lines. Every time image data of 16 lines are output from the image reading control unit 6, the scan job control unit 307 inputs them to the image processing unit 9 to JPEG-encode them. After executing JPEG encoding, the image processing unit 9 sequentially writes the compressed image data in another area of the RAM 13. At this time, an area where JPEG encoding has already ended is freed out of areas of the RAM 13 to which the image reading control unit 6 has output image data. The freed area is set again as an area to which the image reading control unit 6 outputs image data. This arrangement can reduce a capacity necessary to execute the actual operation of the output buffer of the image reading control unit 6 in the RAM 13.

The scan job control unit 307 also generates region information representing regions where image data corresponding to the respective obverse and reverse surfaces of a document are arranged when outputting image data. In accordance with the region information, address information in the RAM 13 that is output from the image reading control unit 6, the input address of image data JPEG-encoded by the image processing unit 9, and image size information are determined. By the above-described processing, the JPEG-encoded image data becomes image data in which the image data of the respective obverse and reverse surfaces are aligned side by side, as shown in FIG. 8.

First, the data transmission job control unit 306 sends, to the computer 3 via the external interface 4, the region information generated by the scan job control unit 307. Then, the data transmission job control unit 306 sequentially transmits the encoded image data in the RAM 13 to the computer 3. As for the transmission of image data, JPEG-encoded data are sequentially transmitted, so a series of processes of image reading, JPEG encoding, and data sending can be performed in parallel to send the image data to the computer 3 at high speed. The computer 3 decodes the received JPEG-encoded image data in FIG. 8, and performs image data extraction processing based on the received region information, acquiring image data corresponding to the obverse surface and image data corresponding to the reverse surface.

Next, a case will be explained, in which the computer 3 does not cope with processing of extracting image data of the respective obverse and reverse surfaces from integrated image data of the obverse and reverse images. In this case, the computer 3 does not support the <duplex_custom> command, and transmits a command as shown in FIG. 4B to the MFP 1 in order to individually obtain image data of the obverse surface and image data of the reverse surface. To respond to the received command, the MFP 1 needs to generate independent image data for the respective obverse and reverse surfaces, and transmit them to the computer 3. The MFP 1 uses the PC scan application 302 to analyze the command received from the computer 3, and generate job information shown in FIG. 7B. In this case, since the command is a double-sided request in which <duplex_custom> is not designated, "double-sided" is designated as the double-sided type of job information.

The job management unit 305 looks up the job selection table 900 to select a job control unit to be used. Since "application" in the job information shown in FIG. 7B is "PC scan" and "double-sided reading type" is "double-sided", the scan job control unit 307 is selected as the first job control unit. In addition, the image processing job control unit 308 is selected as the second job control unit, and the data transmission job control unit 306 is selected as the third job control unit. In accordance with the selection, the job management unit 305 requests the scan job control unit 307 serving as the first job control unit to read an image, and requests the image processing job control unit 308 serving as the second job control unit to separate the obverse and reverse surfaces of the image data. Further, the job management unit 305 requests the data transmission job control unit 306 serving as the third job control unit to transmit the image data of the obverse surface and the image data of the reverse surface to the computer 3.

The scan job control unit 307 generates JPEG-encoded image data by connecting side by side image data corresponding to the read obverse and reverse surfaces by the same operation as that of "double-sided_connect". Also, the scan job control unit 307 generates region information for each of the obverse and reverse surfaces. The image processing job control unit 308 stands by until the scan job control unit 307 ends generation of the integrated JPEG-encoded image data of the obverse and reverse surfaces. After the end of generating one JPEG-encoded image data by the scan job control unit 307, the image processing job control unit 308 designates a region to be decoded in the JPEG-encoded image data by using region information about the obverse surface out of the generated region information. The image processing job control unit 308 issues a processing request to the image processing unit 9 to perform decoding based on the designated region information. The image processing job control unit 308 issues a processing request to the image processing unit 9 to re-encode the decoded image data.

The image processing unit 9 decodes the region designated by the region information out of the JPEG-encoded image data for every 16 lines, temporarily writes them in the RAM 13, and re-encodes the decoded image data in the RAM 13 for every 16 lines. By performing decoding and re-encoding for the region of the obverse surface, image data corresponding to the obverse surface is separated to generate JPEG-encoded image data (image data of the obverse surface). After the end of re-encoding the image data corresponding to the obverse surface, the image processing job control unit 308 performs decoding and re-encoding by using the region information similarly for image data corresponding to the reverse surface. After that, the data transmission job control unit 306 controls the external interface 4 to sequentially transmit, to the computer 3, the JPEG-encoded image data corresponding to the obverse surface and the JPEG-encoded image data corresponding to the reverse surface.

Figure 10A:
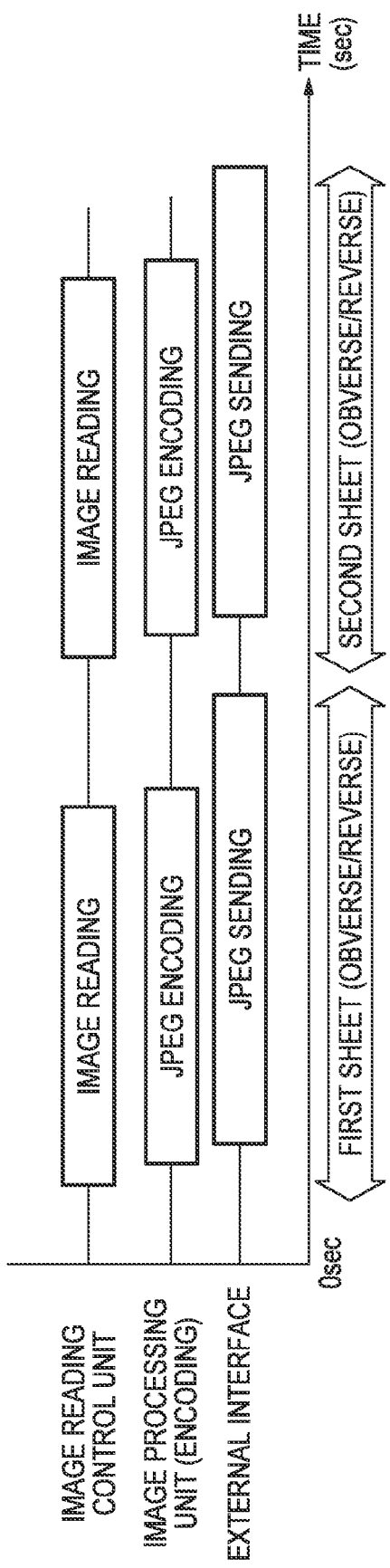

The processing when a command from the computer 3 includes designation of "Connect" in <duplex_custom>, and the processing when it does not include designation of <duplex_custom> have been explained above. FIGS. 10A and 10B are timing charts each showing the processing order and time of the MFP 1 in each of these cases. FIG. 10A is a timing chart when <duplex_custom> includes designation of "Connect". As shown in FIG. 10A, image reading, JPEG encoding, and JPEG decoding are performed in parallel, and the difference between the end timings of image reading and transmission of JPEG-encoded data is small. In contrast, when designation of <duplex_custom> is not included, decoding and re-encoding need to be performed, and processing takes a longer time than in the former case. Especially in the case of reading a plurality of document sheets, when <duplex_custom> includes designation of "Connect", reading of the second document sheet can be started quickly because the device and resource of the MFP 1 are released soon, which is advantageous to productivity. To the contrary, when designation of <duplex_custom> is not included, the computer 3 can receive JPEG-encoded image data of the obverse and reverse surfaces separated one by one. This processing can be executed, for example, when the computer 3 cannot execute separation of image data, or when the hardware resource necessary to separate image data is poor and execution takes time, which is advantageous to versatility. In the above description, processing is switched depending on whether <duplex_custom> includes designation of "Connect". However, when the PC scan application 302 is configured to accept various command systems, a command system in which a special command such as <duplex_custom> does not exist may be handled. That is, the CPU 11 may accept instruction information including no <duplex_custom>. Even in such a case, the CPU 11 can control to transmit JPEG-encoded image data of the obverse and reverse surfaces separated one by one. The MFP 1 can therefore support various command systems.

As described above, the job management unit 305 switches job control units as the first to third job control units to which processes are assigned in accordance with a received command. By this switching, the PC scan application 302 can switch whether to execute separation of image data. The PC scan application 302 has been exemplified above. In the case of copying, the image processing job control unit 308 for performing separation is not designated, as represented by the job control unit selection table 900 in FIG. 9. The copy function is implemented by outputting only necessary regions of the obverse and reverse surfaces to the image forming unit 10 when the print job control unit 309 controls the image processing unit 9 to decode JPEG-encoded image data in a state in which the obverse and reverse surfaces are connected. Since the copy function is a function implementable by only the MFP 1, this arrangement pursues productivity. The FAX application 303 executes a so-called facsimile transmission function of transmitting image data to a partner device through a telephone line via the modem 16. In the case of the facsimile transmission function, only a system which separates image data is performed. This arrangement is adopted because devices provided by various manufacturers are conceivable as the partner device serving as an image data transmission destination. In addition, this arrangement aims to prevent transmission of the special format of JPEG-encoded image data in a state in which the obverse and reverse surfaces are connected in a situation in which and no unique command can be prepared.

In this embodiment, when separating image data in the WI' 1, JPEG encoding causes some image degradation. Particularly in this embodiment, since encoded image data is decoded and then re-encoded, there is a fear of double image data degradation. In JPEG encoding, quantization is performed using a predetermined threshold of image data. However, if an image once degraded by the predetermined quantization threshold is degraded by another quantization threshold in the second encoding processing, the degradation stands out more seriously. To prevent this, the same quantization table is used for these two processes so that the same threshold is used for quantization processing in the first encoding processing and quantization processing in the second encoding processing. Accordingly, the degradation of the image quality can be suppressed. In this embodiment, the WI' 1 holds two types of quantization tables. When "normal" is designated as the quality in job information, a quantization table for the normal is used similarly for the first encoding and the second encoding. When "fine" is designated, a quantization table for "fine" is used similarly for the first encoding and the second encoding. The job management unit 305 therefore notifies the scan job control unit 307 and the image processing job control unit 308 of even information about the quality in the job information.

Figure 11:
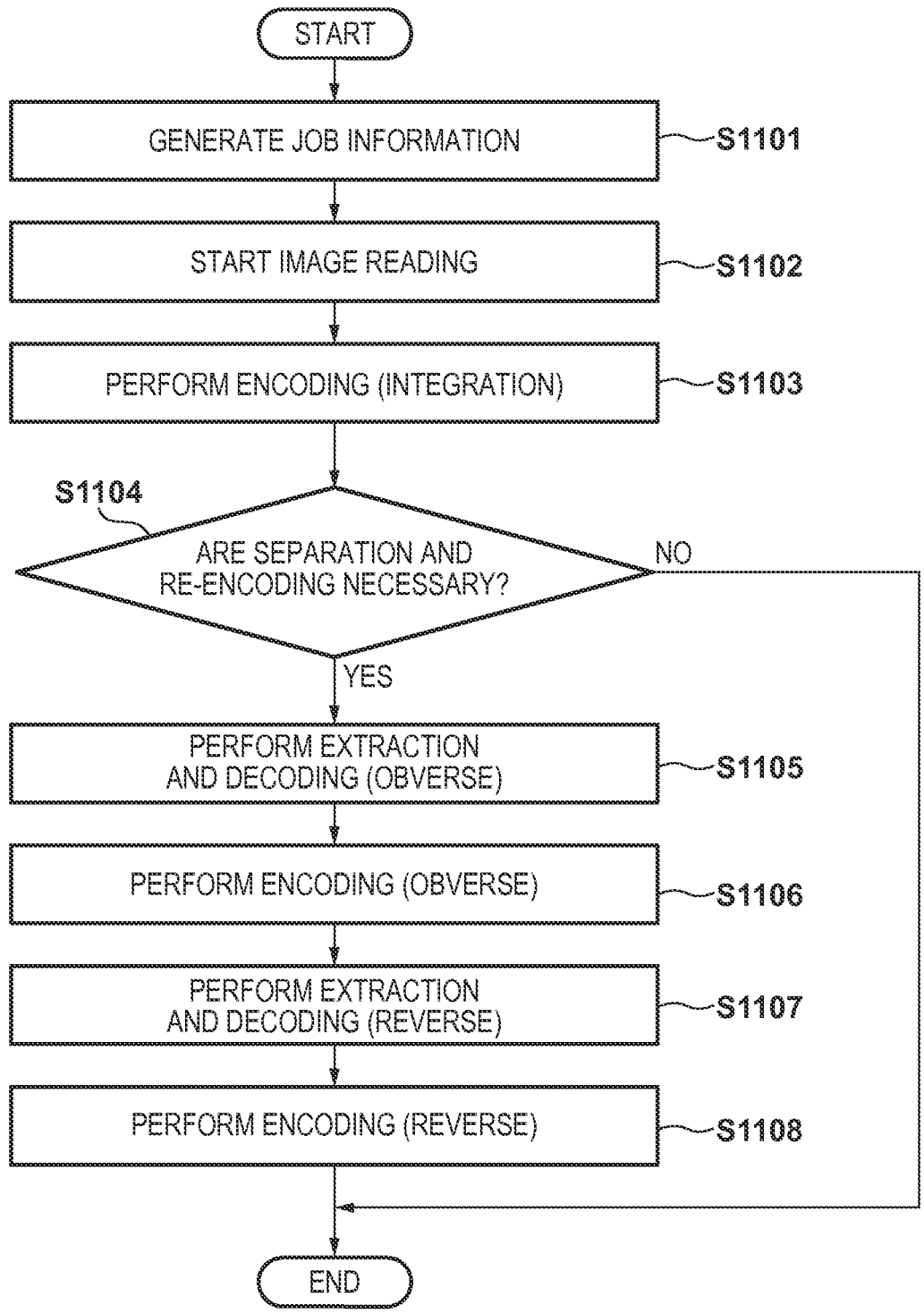
FIG. 11 is a flowchart showing the procedures of data control processing.

FIG. 11 is a flowchart showing the procedures of data control processing corresponding to whether separation of image data by the computer 3 is possible, based on the above-described operation. Each processing in FIG. 11 is performed by, for example, reading out a program stored in the ROM 12 and implementing each block shown in FIG. 3 by the CPU 11.

In step S1101, the CPU 11 generates job information as shown in FIG. 7A or 7B based on a command received from the computer 3. In step S1102, the CPU 11 starts image reading. In step S1103, the CPU 11 JPEG-encodes integrated image data of the obverse and reverse surfaces of a document.

In step S1104, the CPU 11 determines, based on the command received from the computer 3, whether separation of the obverse and reverse surfaces of image data and re-encoding are necessary. The determination in step S1104 may be performed in accordance with whether <duplex_custom> is designated by "Connect" in the command received from the computer 3. The designation by "Connect" represents that separation of image data by the computer 3 is possible. If the CPU 11 determines in step S1104 that separation and re-encoding are unnecessary, it ends the processing in FIG. 11. In this case, integrated image data of the obverse and reverse surfaces is used at subsequent stages of this processing. Processes at the subsequent stages are, for example, transmission processing to the host computer 3 and print processing by the image forming unit 10. If the CPU 11 determines that separation and re-encoding are necessary, it advances to step S1105. In step S1105, the CPU 11 extracts and decodes a region corresponding to the obverse surface out of the integrated image data of the obverse and reverse surfaces. In step S1106, the CPU 11 re-encodes the decoded image data. In step S1107, the CPU 11 extracts and decodes a region corresponding to the reverse surface out of the integrated image data of the obverse and reverse surfaces. The CPU 11 re-encodes the decoded image data in step S1108, and then ends the processing in FIG. 11. By the above-described processing, the separated image data of the obverse and reverse surfaces can be acquired.

This embodiment employs the arrangement having processes of two systems for the arrangement in which the MFP 1 configured to almost simultaneously read the obverse and reverse surfaces transmits image data directly to an external apparatus without separating the image data into the obverse and reverse surfaces, and the arrangement in which the MFP 1 separates image data into the obverse and reverse surfaces. By appropriately switching the processes of these two systems, an optimum processing system can be adopted in accordance with which of versatility and productivity is important. Note that this embodiment has described an arrangement in which image data is transmitted to the computer 3 connected via the external interface 4. However, for example, the same effects as those in this embodiment are obtained even by an arrangement in which image data is stored in a USB-connected memory.

Note that whether to separate image data is determined based on whether <duplex_custom> includes designation of "Connect" in this embodiment, but may be determined by another method. For example, whether to separate image data may be determined depending on a command transmission source. More specifically, when the command transmission source is a smartphone, the CPU 11 may determine to separate and transmit image data, and when the command transmission source is a personal computer, integrated image data may be transmitted.

Second Embodiment

The first embodiment has described a case in which the MFP 1 or the computer 3 separates integrated image data of the obverse and reverse surfaces into image data of the respective obverse and reverse surfaces. The second embodiment will explain an arrangement in which region information is applied. An operation to be described below is executable even in a MFP 1 in which the first embodiment is executed.

Figure 12A:
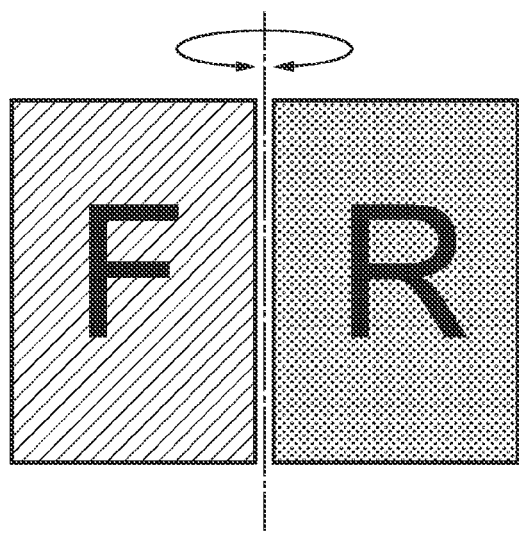
FIGS. 12A and 12B are views for explaining a document of long-edge binding and a document of short-edge binding.
Figure 12B:
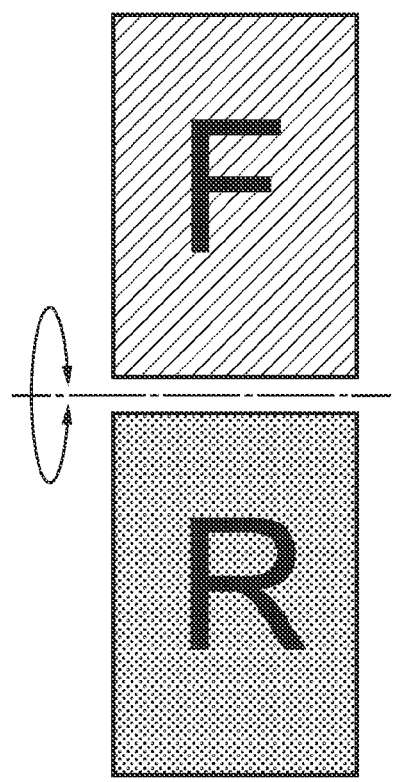

The second embodiment is different from the first embodiment in the operation of a scan job control unit 307 in FIG. 3. In the second embodiment, the document binding position can be set in addition to the items of job information shown in FIG. 6, and can also be referred to from the scan job control unit 307. Here, the document binding position is information representing an orientation in which the image of the reverse surface is formed with respect to the obverse surface. A document of long-edge binding is a document in which when the document is reversed along the long side of the document serving as an axis, the top and bottom of the image of the reverse surface match those of the image of the obverse surface, as shown in FIG. 12A. A document of short-edge binding is a document in which when the document is reversed along the short side of the document serving as an axis, the top of a document sheet and the bottom of a subject document sheet coincide with each other, as shown in FIG. 12B. In the case of a document of short-edge binding, the top and bottom of the reverse surface of a document become opposite to those of the obverse surface, and read image data of the obverse and reverse surfaces are in the opposite orientations.

Figure 13A:
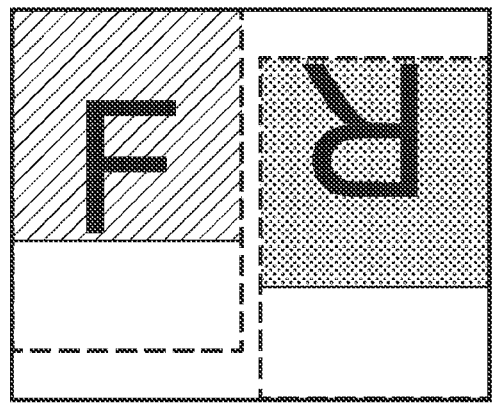
FIGS. 13A and 13B are views showing image data when a document shorter than a designated size is read.
Figure 13B:
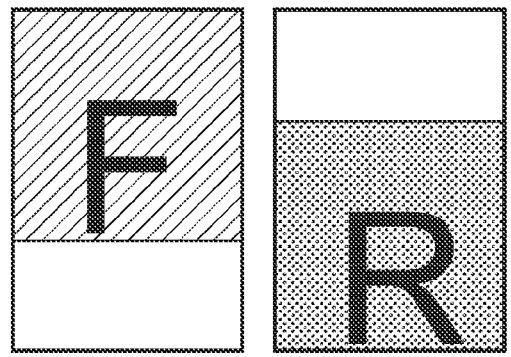

When the length of an actually read document becomes smaller than that of a designated document size, for example, white image data (data for adjustment) equivalent to the underlayer is added so that the length of the read image becomes equal to that of the designated document size. As a result, image data having the length of the designated document size is generated. FIGS. 13A and 13B are views showing image data when a document of short-edge binding, which is shorter than a requested (designated) size, is read. FIG. 13A shows a state before separating image data, and shows a state in which when it is found out that the length of the document is small, white image data equivalent to underlayer data is added in the trailing end direction of the image and JPEG encoding is performed. In the state of FIG. 13A, separation of image data is performed using a document reading start position as a reference. Further, the reverse surface is rotated and displayed so that the top and bottom of the reverse surface match those of the document, thereby obtaining a state shown in FIG. 13B. That is, the obverse and reverse surfaces of the document vertically shift from each other, as shown in FIG. 13B, resulting in poor appearance to the user. The second embodiment avoids this state by the following processing.

Figure 14:
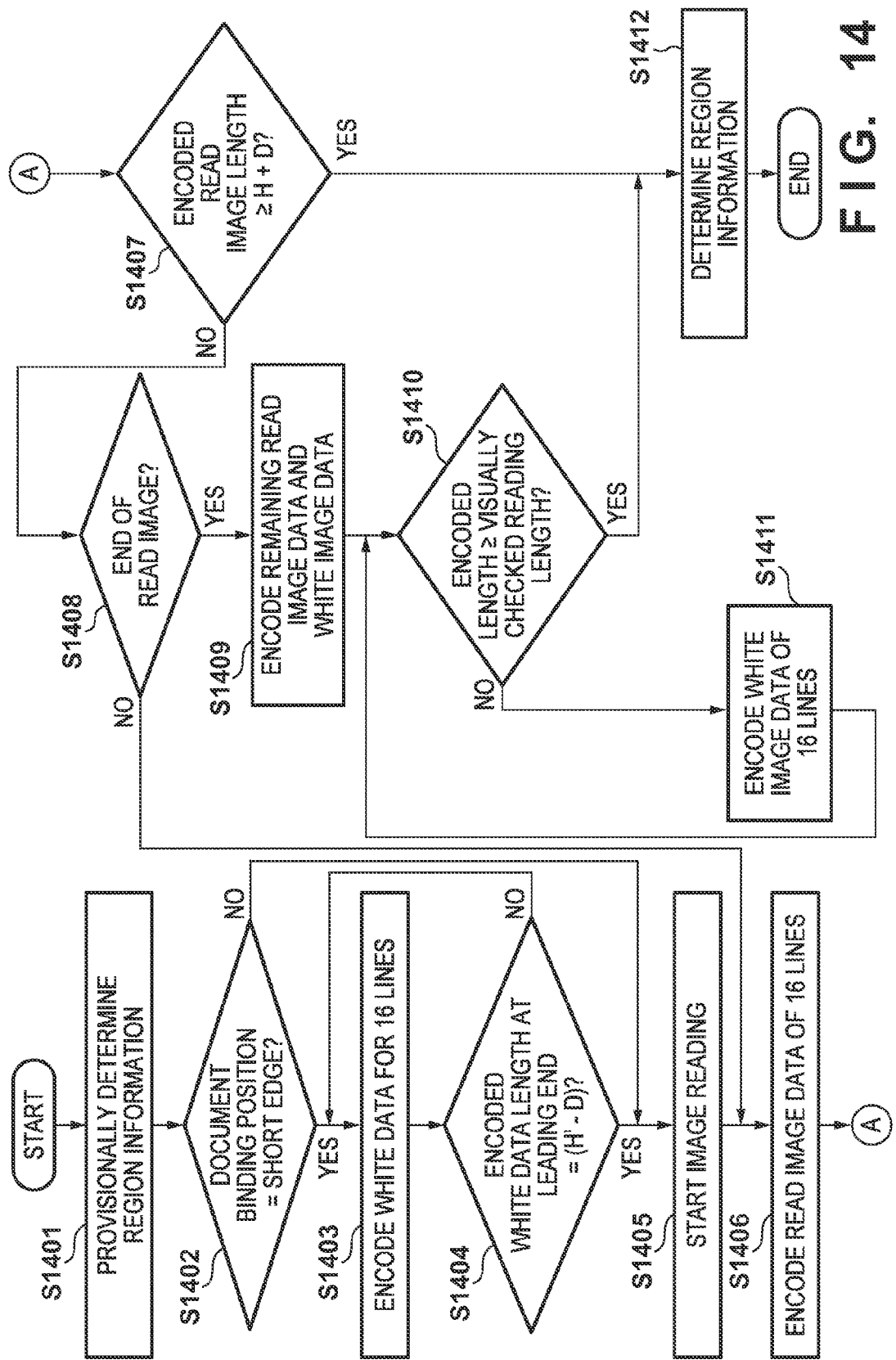
FIG. 14 is a flowchart showing data control processing of adding data for adjustment.
Figure 15A:
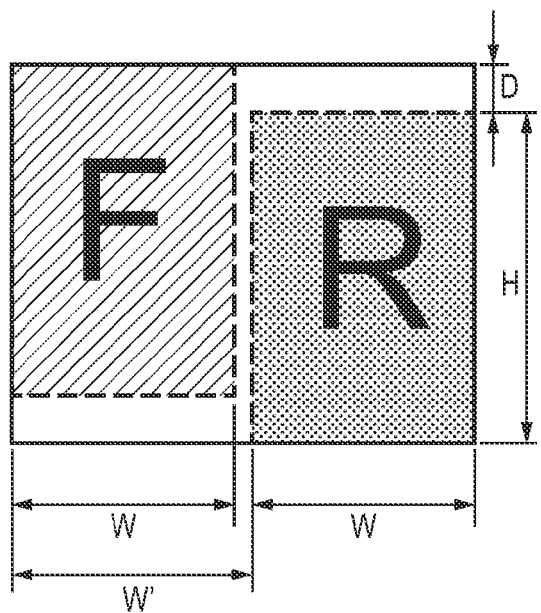
FIGS. 15A and 15B are views for explaining region information of each image data.
Figure 15B:
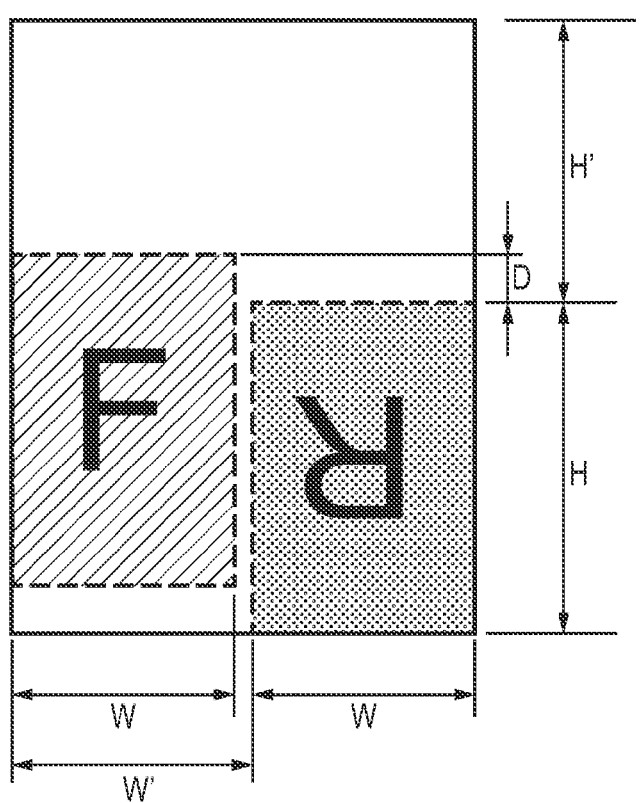

FIG. 14 is a flowchart showing data control processing of adding data for adjustment to read image data. The operation of the scan job control unit 307 will be explained with reference to FIG. 14. In step S1401, a CPU 11 provisionally determines region information of each image data in accordance with information representing long-edge binding or short-edge binding set for the document in job information. Information of the binding direction is not shown in FIGS. 6, 7A, and 7B, but is included as an item in the job information in this embodiment. In the case of a document of long-edge binding, region information of each image data is provisionally determined, as shown in FIG. 15A. More specifically, when the length of the designated document is H and the width is W, the region information is provisionally determined so that image data corresponding to the obverse surface is arranged from the origin of the region of the image data, and image data corresponding to the reverse surface is arranged from a position corresponding to W' (number of pixels) in the lateral direction and D in the longitudinal direction. Each of W, W', H, H', and D in FIGS. 15A and 15B is the number of pixels. At this time, the image start position W' is adjusted so that respective image data corresponding to the obverse and reverse surfaces are not included in the same MCU block in consideration of JPEG encoding to be executed at a subsequent stage. In this embodiment, W' is, for example, a value obtained by rounding up the document width W to a multiple of 16 so as to prevent coexistence of image data of the obverse and reverse surfaces in the MCU block upon JPEG encoding. The image start position D of image data corresponding to the reverse surface arises from the physical distance between a first surface image reading unit 209 and a second surface image reading unit 210. When data read by the first surface image reading unit 209 and the second surface image reading unit 210 by one document conveyance are arranged, the data shift from each other by the image start position D corresponding to the distance between the first surface image reading unit 209 and the second surface image reading unit 210, as shown in FIG. 15A.

Figure 17A:
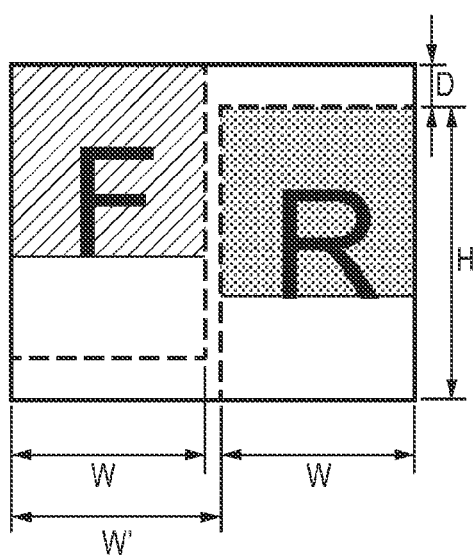
FIGS. 17A and 17B are views for explaining extraction of each image data.
Figure 17B:
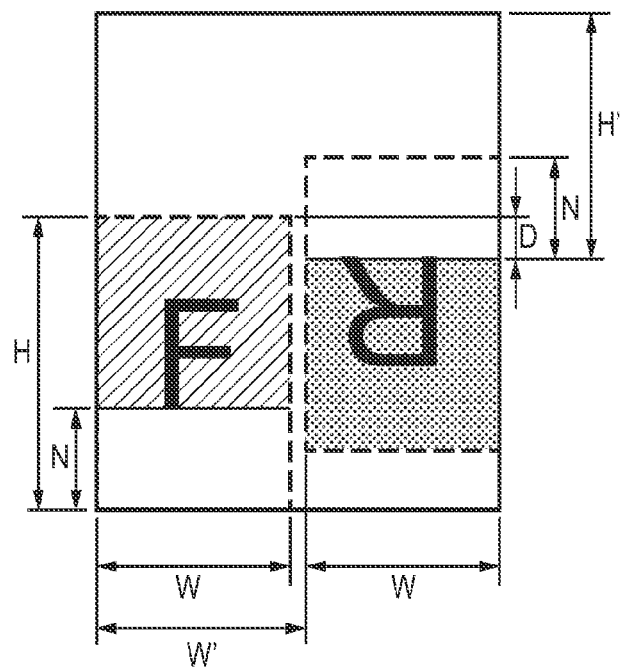

In the case of a document of short-edge binding, the lateral direction W' is the same as that in the case of long-edge binding as for region information of the reverse surface, as shown in FIG. 15B. As for the longitudinal direction, in case that a read document is short, it is designated to add a margin region to the leading end of the document and arrange image data from the position H'. Hence, image data of the obverse surface is also arranged from a position H'–D. In this embodiment, H' is so designated as to be a length equal to or larger than the designated document length H. With this setting, for example, if a read document has 0 or more lines, as shown in FIG. 17B, image data having the designated document length H as a height can be generated. In this embodiment, the difference between H' and D is designated to be a multiple of 16 in order to simplify subsequent JPEG encoding processing. Note that when a length actually readable by the MFP 1 is determined in advance, the length of a read document does not become 0 line, and H' may be smaller than the designated document length H. For example, the length H' may be the difference between a minimum document length readable by the MFP 1 and the designated document length H.

In step S1402, the CPU 11 switches subsequent processing by determining which of short-edge binding and long-edge binding is designated for the document in job information. If the CPU 11 determines that short-edge binding is designated, it advances to step S1403. If the CPU 11 determines that long-edge binding is designated, it advances to step S1405.

In step S1403, the CPU 11 generates white image data for 16 lines in a RAM 13, and performs JPEG encoding. Assume that JPEG encoding by an image processing unit 9 is encoding for every 16 lines. In step S1404, the CPU 11 determines whether the number of data lines JPEG-encoded in step S1403 is equal to the difference between H' and D in FIG. 15B. If the CPU 11 determines that the number of data lines is equal to the difference between H' and D, it advances to step S1405. If the CPU 11 determines that the number of data lines is not equal to the difference between H' and D, it repeats the processing in step S1403. That is, white image data of H'–D in FIG. 15B is generated by the processing in step S1403.

In step S1405, the CPU 11 instructs an image reading control unit 6 to start image reading. When either the obverse or reverse surface of the document exists on a corresponding reading sensor, the image reading control unit 6 outputs each image data corresponding to the obverse or reverse surface.

In step S1406, the CPU 11 JPEG-encodes 16 lines out of the output image data. That is, image data up to the lower end of H-F in FIG. 15B is generated by the processing in step S1406. In step S1407, the CPU 11 determines whether the number of JPEG-encoded lines becomes equal to or larger than the sum of H and D in FIG. 15A or 15B. If the CPU 11 determines that the number of JPEG-encoded lines becomes equal to or larger than the sum of H and D, it advances to step S1412. If the CPU 11 determines that the number of JPEG-encoded lines is smaller than the sum of H and D, it advances to step S1408.

In step S1408, the CPU 11 determines whether image data have already been read by a document length detected by a leading end detection sensor 208 and read image data of 16 lines that can be encoded do not remain, that is, whether image reading has ended. If the CPU 11 determines that image reading has ended, it advances to step S1409. If the CPU 11 determines that image reading has not ended, it repeats the processing in step S1406.

In step S1409, the CPU 11 adds white image data to the output image data, and performs JPEG encoding. That is, image data from the lower end of image data F in FIG. 15B to the lower end of H (image data including lower white image data of the image data F and part of image data R) is generated by the processing in step S1409. In step S1410, the CPU 11 determines whether the length of the image data JPEG-encoded in steps S1406 and S1409 has reached a target reading length. The target reading length is H+D in the case of long-edge binding and H in the case of short-edge binding. If the CPU 11 determines in step S1410 that the length of the image data has reached the target reading length, it advances to step S1412. If the CPU 11 determines that the length of the image data has not reached the target reading length, it advances to step S1411.

In step S1411, the CPU 11 further encodes white image data of 16 lines. That is, in this embodiment, image data insufficient for the obverse and reverse surfaces are added as white image data by the processing in step S1410 and the processing in step S1411.

In step S1412, the CPU 11 determines region information. If the process advances to step S1405 as a result of the determination in step S1402 and to step S1412 as a result of the determination in step S1407, region information of each image data provisionally determined in step S1401 is determined. When encoding of white image data has been performed, region information provisionally determined in step S1401 is adjusted and determined so as to obtain a desired extraction result including white image data. After step S1412, the CPU 11 ends the processing in FIG. 14.

Figure 16A:
FIGS. 16A to 16D are views for explaining how to generate an image.
Figure 16B:
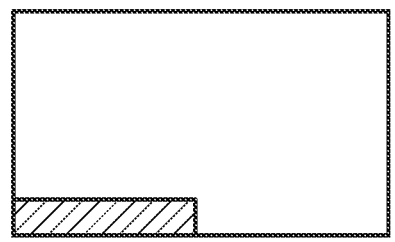
Figure 16C:
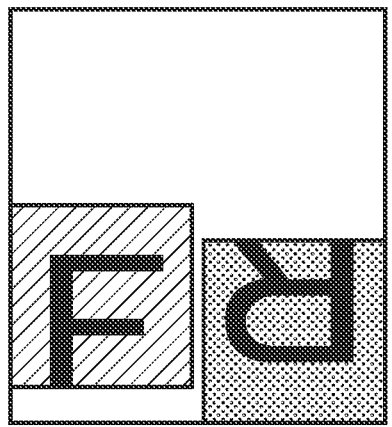
Figure 16D:
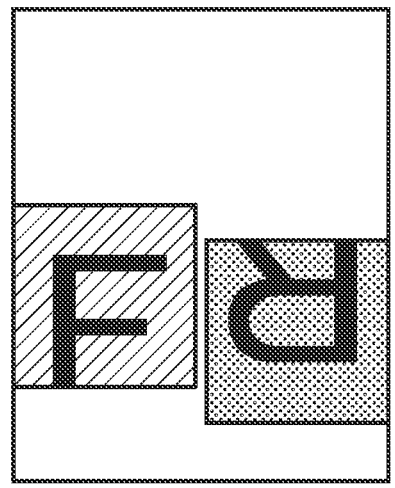

How to generate an image when a document of short-edge binding that is smaller than a requested size is read will be explained with reference to FIGS. 14 and 16A to 16D. First, white image data (image data of H'–D in FIGS. 17A and 17B) is generated by repeating the processing in step S1403, as shown in FIG. 16A. Then, the read image data is JPEG-encoded by the processing in step S1407, and generation of image data in which image data corresponding to the obverse surface is arranged left starts. At this time, as for image data corresponding to the reverse surface, the document has not reached the second surface image reading unit 210 yet, and a white plate is read. The image data in which the image data corresponding to the obverse surface is arranged left and the white data is arranged right is added to the white image data in FIG. 16A, generating image data in FIG. 16B. When the document reaches the second surface image reading unit 210 (YES in step S1408), the image data corresponding to the reverse surface is also output, forming image data, as shown in FIG. 16C. Finally, white image data at the trailing end of the document is generated by the processing in step S1409 and the processing in step S1411, forming image data, as shown in FIG. 16D.

Figure 18A:
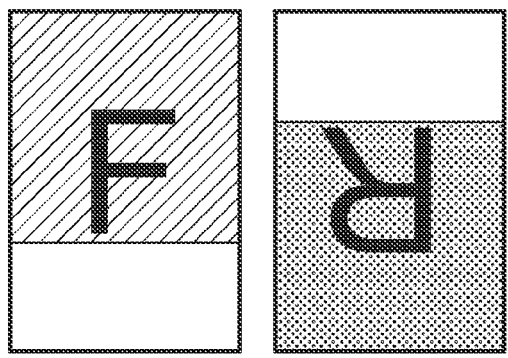
FIGS. 18A and 18B are views showing the form of display of each extracted image data.
Figure 18B:
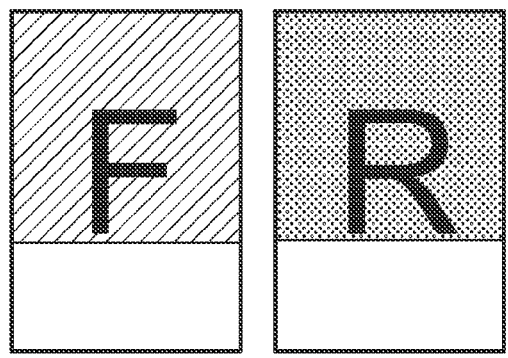

The region information adjusted in step S1412 will be explained with reference to FIGS. 17A and 17B. When a document has long-edge binding designation, even if an actually read document size is smaller than a designated document length, an arrangement as shown in FIG. 17A is adopted, and region information may represent the same region as that in FIG. 15A. In contrast, when a document has short-edge binding designation, the image arrangement position of the obverse surface in the longitudinal direction is H'–D, as in FIG. 15B. Here, N is the difference between an actually read document length and a designated document length. Region information for extracting image data corresponding to the reverse surface sets, as the start position of region information for extraction, H'–N shifted by N in the up direction (lower direction of an image) in FIG. 17B. Then, the lower end of a portion where image data exists is set as the end position of the region information. By extracting image data in accordance with the thus-determined region information, image data corresponding to the obverse surface with a margin at a lower portion, and image data corresponding to the reverse surface with a margin at a lower portion can be extracted, as shown in FIG. 18A. That is, a region (dotted region of the image data R in FIGS. 17A and 17B) including at least part of the white image data generated in step S1403 and image data of the second image is determined as region information of the image data of the second image. Then, the reverse surface is rotated and displayed so that the top and bottom of the reverse surface match those of the document. Hence, the margin positions of the obverse and reverse are aligned, as shown in FIG. 18B, and image data natural for the user can be generated.

As described above, according to the second embodiment, white image data is added in advance to the leading end of a document in accordance with the setting of the binding direction, and white image data corresponding to a shortage is added to even the trailing end of the document. With this arrangement, when a document is shorter than a designated size, an insufficient region can be compensated for in accordance with the orientation of an image printed on the document regardless of the binding direction. For example, even when integrated image data of the obverse and reverse are transmitted to a computer 3, it is only necessary to notify the computer 3 of the adjusted region information. As a result, even when a document is short and has short-edge binding, the computer 3 can appropriately separate image data, as in a designated document.

Note that margins are added to the upper and lower portions of integrated image data of the obverse and reverse surfaces in this embodiment. However, white image data may be added to separate image data of the obverse and reverse. For example, in the case of a document of short-edge binding, white image data corresponding to a shortage to a target document length may be added to the trailing end of the document of image data corresponding to the obverse surface, and white image data equivalent to the target document length may be added in advance to the leading end of the document of image data corresponding to the reverse surface.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-166096, filed Aug. 18, 2014, which is hereby incorporated by reference herein in its entirety.

What is claimed is:

1. An image reading apparatus communicable with an information processing apparatus, the image reading apparatus comprising:
   a first reading unit configured to read a first surface of a document;
   a second reading unit configured to read a second surface of the document;
   a first determination unit configured to determine whether or not a reading instruction associated with a facsimile transmission function is input;
   a second determination unit configured to determine whether to separately send image data of the first surface and image data of the second surface or send integrated image data, the integrated image data including the image data of the first surface and the image data of the second surface; and
   a sending unit configured to separately send the image data of the first surface and the image data of the second surface or send the integrated image data, based on a determination result of the second determination unit, to the information processing apparatus,
   wherein a reading process of the first reading unit and a reading process of the second reading unit are concurrently performed, and
   wherein, based on a determination result of the first determination unit that the reading instruction associated with the facsimile transmission function is input, the second determination unit determines to separately send the image data of the first surface and the image data of the second surface that are obtained by concurrently performing a reading process of the first reading unit and a reading process of the second reading unit.

2. The apparatus according to claim 1, further comprising:
a generation unit configured to generate the integrated image data, and
a separation unit configured to, in a case where the second determination unit determines to separately send the image data of the first surface and the image data of the second surface, separate the integrated image data generated by the generation unit into the image data of the first surface and the image data of the second surface.

3. The apparatus according to claim 1, further comprising:
a third determination unit configured to determine whether a size of the document read by the first reading unit and the second reading unit is smaller than a document size designated in reading; and
an addition unit configured to, in a case where the third determination unit determines that the size of the document is smaller than the designated document size, add data for adjustment to the integrated image data.

4. The apparatus according to claim 3, wherein the addition unit adds the data for adjustment in a leading end of an image represented by the image data of the first surface, and in a trailing end of an image represented by the image data of the second surface in the integrated image data.

5. The apparatus according to claim 1, further comprising a supply unit configured to supply a document to a reading position of the first reading unit and a reading position of the second reading unit,
wherein the first reading unit and the second reading unit are provided along a conveyance path of the document.

6. The apparatus according to claim 1, further comprising:
a generation unit configured to generate the integrated image data; and
a setting determination unit configured to determine whether or not the reading instruction includes information indicating short-edge binding,
wherein in a case where the setting determination unit determines that the reading instruction includes the information indicating short-edge binding, the generation unit generates blank data for adjustment, combines the blank data with reading results of the first reading unit and the second reading unit, and generates the integrated image data including the blank data.

7. The apparatus according to claim 6, wherein a top and bottom of an image corresponding to the image data of the first surface included in the integrated image data and a top and bottom of an image corresponding to the image data of the second surface included in the integrated image data are converse with each other.

8. A control method to be executed in an image reading apparatus, which is communicable with an information processing apparatus, including a first reading unit configured to read a first surface of a document, and a second reading unit configured to read a second surface of the document, the method comprising:
determining whether or not a reading instruction associated with a facsimile transmission function is input;
determining whether to separately send image data of the first surface and image data of the second surface or send integrated image data, the integrated image data including the image data of the first surface and the image data of the second surface;
separately sending the image data of the first surface and the image data of the second surface or sending the integrated image data, based on a result of the determination on whether to separately send the image data of the first surface and the image data of the second surface or send the integrated image data, to the information processing apparatus;
concurrently performing a reading process of the first reading unit and a reading process of the second reading unit; and
wherein, based on a determination result that the reading instruction associated with the facsimile transmission function is input, separately sending the image data of the first surface and the image data of the second surface that are obtained by concurrently performing the reading process of the first reading unit and the reading process of the second reading unit, respectively, to the information processing apparatus.

9. The control method according to claim 8, further comprising:
performing a generation process of the integrated image data; and
separating the integrated image data generated in the generation process into the image data of the first surface and the image data of the second surface in a case where it is determined that the image data of the first surface and the image data of the second surface are separately sent.

10. The control method according to claim 8, further comprising:
determining whether a size of the document read by the first reading unit and the second reading unit is smaller than a document size designated in reading; and
in a case where it is determined that the size of the document is smaller than the designated document size, adding data for adjustment to the integrated image data.

11. The control method according to claim 10, wherein the data for adjustment is data representing a base color of the document.

12. The control method according to claim 10, wherein the data for adjustment is added in a leading end of an image represented by the image data of the first surface, and the data for adjustment is added in a trailing end of an image represented by the image data of the second surface in the integrated image data.

13. The control method according to claim 8, further comprising supplying a document to a reading position of the first reading unit and a reading position of the second reading unit,
wherein the first reading unit and the second reading unit are provided along a conveyance path of the document.

14. The control method according to claim 8, further comprising:
performing a generation process to generate the integrated image data; and
determining whether or not the reading instruction includes information indicating short-edge binding,
wherein in a case where it is determined that the information indicating short-edge binding is included in the reading instruction, the generation process generates blank data for adjustment, the blank data and reading results of the first reading unit and the second reading unit are combined, and the integrated image data including the blank data is generated.

15. The control method according to claim 14, wherein a top and bottom of an image corresponding to the image data of the first surface included in the integrated image data and a top and bottom of an image corresponding to the image data of the second surface included in the integrated image data are converse with each other.

16. The control method according to claim 15, wherein, in the integrated image data including the blank data, the blank data is arranged in a leading end of the image data of the first surface, and the blank data is arranged in a trailing end of the image data of the second surface.

17. The control method according to claim 8, wherein in a case where the reading instruction which is input does not include a predetermined command, the integrated image data is sent.

18. A control method to be executed in an image reading apparatus, which is communicable with an information processing apparatus via a network, including a first reading unit configured to read a first surface of a document, and a second reading unit configured to read a second surface of the document, the method comprising:
- receiving a reading instruction from the information processing apparatus via the network;
- separately sending image data of the first surface and image data of the second surface to the information processing apparatus which is a sending source of the reading instruction, in a case where the reading instruction which does not include a predetermined command is received from the information processing apparatus via the network; and
- sending integrated image data including the image data of the first surface and the image data of the second surface to the information processing apparatus which is a sending source of the reading instruction, in a case where the reading instruction including the predetermined command is received from the information processing apparatus via the network.

19. The control method according to claim 18, further comprising:
- performing a generation process of the integrated image data; and
- separating the integrated image data generated in the generation process into the image data of the first surface and the image data of the second surface in a case where the reading instruction including the predetermined command is received from the information processing apparatus via the network.

20. The control method according to claim 19, further comprising:
- determining whether a size of the document read by the first reading unit and the second reading unit is smaller than a document size designated in the reading instruction; and
- in a case where it is determined that the size of the document is smaller than the designated document size, adding data for adjustment to the integrated image data.

21. The control method according to claim 18, wherein the second surface is a reverse side of the first surface.

* * * * *